(12) United States Patent
Fujimoto et al.

(10) Patent No.: US 8,516,389 B2
(45) Date of Patent: Aug. 20, 2013

(54) RE-USING A DISPLAY ELEMENT ASSOCIATED WITH A FIRST CELL FOR A SECOND CELL

(75) Inventors: Shunsuke Fujimoto, Kanagawa-ken (JP); Ken Kumagai, Kanagawa (JP); Kinichi Mitsui, Tokyo (JP); Yuhki Sakuma, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/368,958

(22) Filed: Feb. 10, 2009

(65) Prior Publication Data
US 2009/0210819 A1    Aug. 20, 2009

(30) Foreign Application Priority Data
Feb. 18, 2008    (JP) .................................. 2008-36408

(51) Int. Cl.
*G06F 3/048* (2013.01)
*G06F 17/24* (2006.01)

(52) U.S. Cl.
USPC ........................... 715/784; 715/217; 715/220

(58) Field of Classification Search
USPC ................. 715/212–220, 227, 782–787, 223, 715/209, 233, 781, 973
See application file for complete search history.

(56) References Cited

U.S. PATENT DOCUMENTS

| | | | | |
|---|---|---|---|---|
| 4,342,991 A | * | 8/1982 | Pope et al. | 345/28 |
| 5,396,587 A | * | 3/1995 | Reed et al. | 715/219 |
| 5,598,519 A | * | 1/1997 | Narayanan | 715/219 |
| 5,900,915 A | * | 5/1999 | Morrison | 725/44 |
| 6,859,907 B1 | * | 2/2005 | McGarry | 715/201 |
| 6,988,241 B1 | * | 1/2006 | Guttman et al. | 715/220 |
| 7,797,643 B1 | * | 9/2010 | Jobs et al. | 715/815 |

(Continued)

FOREIGN PATENT DOCUMENTS

| | | |
|---|---|---|
| JP | 11120256 A | 4/1999 |
| JP | 2002133360 A | 5/2002 |
| JP | 2005267652 A | 9/2005 |

OTHER PUBLICATIONS

Haugland, S., "Google Spreadsheets Review", [online], Jun. 13, 2006, [retrieved on Oct. 16, 2008], retrieved from the Internet at <URL: http://searchenterpriselinux.techtarget.com/tip/0,289483,sid39_gci1193521,00.html>, 8 pp.

(Continued)

*Primary Examiner* — Doon Chow
*Assistant Examiner* — Wilson Varga
(74) *Attorney, Agent, or Firm* — Janaki K. Davda; Konrad, Raynes, Davda & Victor LLP

(57) ABSTRACT

An application is executed which provides a grid display and which includes: a spreadsheet generator for generating a screen comprising a group of display elements; a scroll controller for accepting a scroll operation of a screen displayed on a display device and for controlling the scrolling of the screen. If a cell is excluded from and a cell is newly included in a visible region displayed on the display device as a result of a scrolling operation, the scroll controller causes the cell included in the visible region to be displayed on the display device by modifying a content of an attribute, including location information, of a display element used to display the cell excluded from the visible region to a content for displaying the cell included in the visible region.

18 Claims, 16 Drawing Sheets

(56) References Cited

U.S. PATENT DOCUMENTS

| | | | |
|---|---|---|---|
| 2002/0184261 A1 | 12/2002 | Yamane | |
| 2004/0002987 A1* | 1/2004 | Clancy et al. | 707/101 |
| 2004/0268227 A1* | 12/2004 | Brid | 715/504 |
| 2005/0044486 A1* | 2/2005 | Kotler et al. | 715/503 |
| 2006/0253775 A1* | 11/2006 | Ovetchkine et al. | 715/517 |
| 2007/0136268 A1* | 6/2007 | Qureshi et al. | 707/4 |
| 2008/0079972 A1* | 4/2008 | Goodwin et al. | 358/1.12 |
| 2008/0109327 A1* | 5/2008 | Mayle et al. | 705/27 |
| 2009/0106687 A1* | 4/2009 | De Souza Sana et al. | 715/784 |
| 2010/0175023 A1* | 7/2010 | Gatlin et al. | 715/788 |

OTHER PUBLICATIONS

Internet Watch, "Bei Google Hyoukeisan Web Apurikeshon "Google Spreadsheets" Beta Ban (Beta Version of Spreadsheet Application "Google Spreadsheets" of US Google Inc.)", [online], Jun. 7, 2006 [searched on Dec. 28, 2007], retrieved from the Internet at <URL: http://internet.watch.impress.co.jp/cda/news/2006/06/07/12229. html>, 3 pp.

Needleman, R., "Google Spreadsheets", [online], Jun. 16, 2006, [retrieved on Oct. 16, 2008], retrieved from the Internet at <URL: http://reviews.cnet.com/online-software-services/google-spreadsheets/4505-9239_7-31944026.html>, 8 pp.

English Abstract and Machine Translation for JP2005267652A, published Sep. 29, 2005, Total 78 pp.

English Abstract and Machine Translation for JP11120256A, published Apr. 30, 1999, Total 19 pp.

English Abstract for JP2002133360A, published May 10, 2002, Total 2 pp. [Includes English counterpart: US20020184261].

IDS Report, Apr. 27, 2012, from the Apr. 17, 2012 Office Action for JP920070176JP1, Total 2 pp.

* cited by examiner (a)
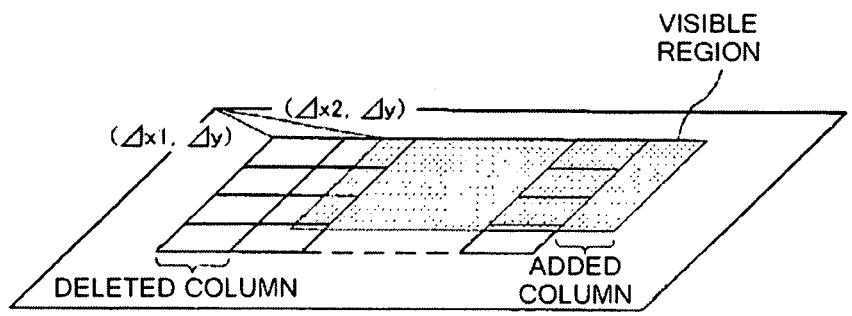
(b)
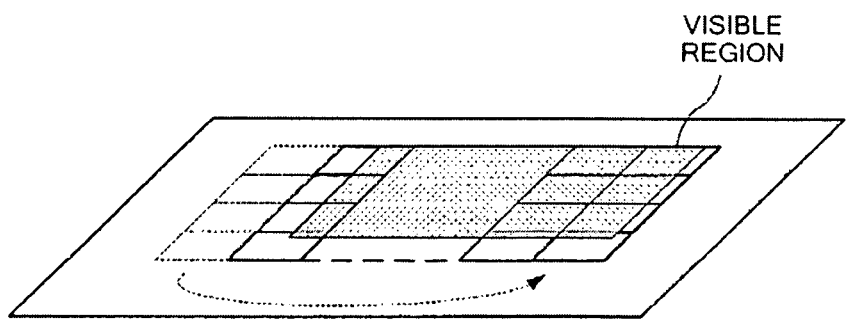
FIG. 4

| | 100 | 90 | 50 | 120 | ..... |
|---|---|---|---|---|---|
| 50 | C(1,1) | C(2,1) | C(3,1) | C(4,1) | ..... |
| 50 | C(1,2) | C(2,2) | C(3,2) | C(4,2) | ..... |
| 60 | C(1,3) | C(2,3) | C(3,3) | C(4,3) | ..... |
| ⋮ | ... | ... | ... | ... | ..... |

FIG. 7

```
var DISPLAY_HEIGHT = HEIGHT OF VISIBLE REGION GIVEN IN ADVANCE;
var ROWS_LIMIT = NUMBER OF ROWS OF WHOLE SPREADSHEET GIVEN IN ADVANCE;
var heights [ROWS_LIMIT] = HEIGHT ARRANGEMENT OF ROWS GIVEN IN ADVANCE;
var max_visible_rows=0; // MAXIMUM VALUE OF NUMBER OF ROWS IN VISIBLE REGION
                          TO BE OBTAINED
var height_sum=0; // SUM OF HEIGHTS OF CURRENTLY VISIBLE ROWS
var top=0; // INDEX OF TOP ROW OF CURRENT VISIBLE REGION
var bottom=0; // INDEX OF BOTTOM ROW OF CURRENT VISIBLE REGION
while (bottom < ROWS_LIMIT) {
    // PROCEED ROWS DOWNWARD UNTIL CURRENT VISIBLE REGION IS FILLED
    while (bottom < ROWS_LIMIT && height_sum < DISPLAY_HEIGHT) {
        height_sum += heights [bottom++] ;
        max_visible_rows++;
    }
    // SCROLL DOWNWARD FOR ONE ROW AND RECALCULATE height_sum UNDER
    ASSUMPTION THAT ONE ROW IS DELETED AND ONE ROW IS ADDITIONALLY
    DISPLAYED
    if (bottom < ROW_LIMIT) {
        height_sum -= heights [top++];
        height_sum += heights [bottom++];
    }
}
```

FIG. 12

|  | 100 | 90 | 50 | 120 | ..... |
|---|---|---|---|---|---|
| 50 | C(1,1) | C(2,1) | C(3,1) | C(4,1) | ..... |
| 50 | C(1,2) | C(2,2) | C(3,2) | C(4,2) | ..... |
| 60 | C(1,3) | C(2,3) | C(3,3) | C(4,3) | ..... |
| ⋮ | ... | ... | ... | ... | ..... |

FIG. 14

RE-USING A DISPLAY ELEMENT ASSOCIATED WITH A FIRST CELL FOR A SECOND CELL

This application is a non-provisional application that claims priority benefits under Title 35, Unites States Code, Section 119(a)-(d) or Section 365(b) of Japan Patent Application entitled "SYSTEM, METHOD AND PROGRAM FOR EXECUTING APPLICATIONS", having Japan Patent Application Serial No. 2008-36408, filed on Feb. 18, 2008, by Ken Kumagai, Kinichi Mitsui, Fujimoto Shunsuke, and Yuhki Sakuma, which application is incorporated herein by reference in its entirety.

BACKGROUND OF THE INVENTION

The present invention relates to a system for executing applications that operate on a browser, particularly applications that provide a grid display such as a spreadsheet. The invention also relates to a control method and a program for the system.

In recent years, the so-called rich user interface techniques, utilizing functions of Dynamic HyperText Markup Language (DHTML) and JavaScript™ (JavaScript is a trademark of Sun Microsystems in the United States, other countries, or both) on a web browser, has been used increasingly. These techniques implement advanced functions of table (grid) form components, spreadsheet user interface components and the like (these components are collectively referred to as spreadsheet, below) with only the standard functions of a web browser.

As a rich user interface, a spreadsheet is created by use of TABLE elements which are predefined, for example, in HyperText Markup Language (HTML) to display a table form. In this case, a row and a column of the spreadsheet can be displayed by using, for example, a TR element and a TD element. In addition, a DIV element may be used to display a cell of the spreadsheet.

Conventional techniques for providing this type of rich user interface include Google Spreadsheets of Google, Inc. of the United States (for example, see beta version of spreadsheet application "Google Spreadsheets" of US Google Inc., [online], 7 Jun. 2006, INTERNET Watch, [searched on 28 Dec. 2007], Internet <URL: http://internet.watch.impress-.co.jp/cda/news/2006/06/07/122 29.html>), and nitobi Grid of Nitobi Software Inc. of Canada. Google Spreadsheets enables the implementation of the spreadsheet function on a web browser. Nitobi Grid provides a grid-form display with a spreadsheet function on a web browser.

In a spreadsheet, the number of cells that can be displayed on a display device at once is at most around 600 to 1000, even with a relatively large and high-resolution display device. However, a business application or the like often requires a spreadsheet including approximately tens of thousands to a million cells. Accordingly, it is inevitable to scroll the screen of the display device when actually using a spreadsheet.

While spreadsheets can be provided in various methods using the rich user interface techniques, the following methods are mainly employed for scrolling the screen.

The first method is to generate a Document Object Model (DOM) structure of a whole spreadsheet before opening the spreadsheet in the first place. In this method, screen elements (such as TR elements and TD elements) are generated for all of the rows and columns of the spreadsheet, once the application is started. In scrolling a screen, among the previously-generated screen elements of the spreadsheet, screen elements corresponding to the display region are sequentially displayed.

The second method is to generate screen elements only for the region actually displayed at the time of initial display. In this case, every time the screen is scrolled to display new rows and columns, necessary DOM structures are sequentially added along with the scrolling operation, and thus screen elements are dynamically generated.

In the case in which a spreadsheet that operates on a web browser is provided by use of the rich user interface technique, screen elements may be generated for every row and column at the time of initial display, or may be generated for only the displayed region at the time of initial display, as mentioned above.

However, with the first method, screen elements are firstly generated for the whole spreadsheet regardless of the size of a displayed region. Hence, wait time for the initial display could be extremely long, depending on the size of the spreadsheet. Additionally, wait time may be also extremely long for an operation to change the configuration of the screen elements, such as changing the height or width of the rows or columns.

Meanwhile, with the second method, although only minimum time is required for initial display, screen elements are generated by adding DOM structures for every scroll of the screen. This inhibits smooth scrolling of the screen since the processing requires time. Additionally, since the DOM structure becomes larger along with the accumulation of generated rows and columns, the load for processing of additional generation of screen elements increases, which slows down the scroll speed even more.

SUMMARY OF THE INVENTION

The present invention aims to solve the above-mentioned problems by achieving both a reduction of time required for initial display, as well as, a reduction of response time of the scrolling operation.

In order to accomplish the above-mentioned objective, the present invention is configured as the following system. In a system for executing an application which provides a grid display, the system includes: a screen generator for generating a screen divided into a grid pattern configured of a group of cell display elements; a display unit for displaying the screen generated by the screen generator on a display device; and a scroll controller for accepting a scrolling operation of the screen displayed on the display device and controlling the scrolling of the screen. In the case in which there is a cell that is excluded from a visible region displayed on the display device and a cell that is newly included in the visible region as a result of the scrolling operation, the scroll controller causes the cell that is included in the visible region to be displayed on the display device in a way that a content of an attribute, including location information, of a display element used to display the cell that is excluded from the visible region is modified to a content for displaying the cell that is included in the visible region.

In this system, in the case in which the number of the cells included in the visible region is larger than that of the cells excluded from the visible region, the scroll controller generates display elements for a number equal to the difference between the two numbers, and causes the cells included in the visible region to be displayed on the display device by use of the generated display elements.

To be more specific, in the case in which the cells are arranged on the screen in a matrix, and in which cells constituting at least one column are excluded from the visible region while cells constituting at least one column are newly included in the visible region as a result of a scrolling operation, the scroll controller modifies attributes of the display elements of cells according to the correspondence between positions in the row direction of the cells of the column that is included in the visible region and positions in the row direction of the cells of the column that is excluded from the visible region.

Moreover, in the case in which cells constituting at least one row are excluded from the visible region while cells constituting at least one row are newly included in the visible region as a result of a scrolling operation, the scroll controller modifies attributes of the display elements of cells according to the correspondence between positions in the column direction of the cells of the row that is included in the visible region and positions in the column direction of the cells of the row that is excluded from the visible region.

More preferably, in this system, in the case in which the screen contains a concatenated cell which is configured of a plurality of the cells handled as a single cell, the scroll controller modifies attributes of the display elements of cells, and detects cells having constituted the concatenated cell since before scrolling, and resets contents of attributes of display elements of the detected cells, to contents for displaying a part of the concatenated cell displayed on the screen after the scrolling.

Furthermore, preferably, the screen generator calculates a maximum value of the number of cells to be displayed at once on the screen, based on the size of the screen and the size of the cell, and generates the screen by generating the display elements of the number specified by the maximum value.

The present invention may also be understood as a method invention. As a method for controlling display of an application which provides a grid display, the method includes a step of generating a screen divided into a grid pattern configured of a group of cell display elements, and displaying the screen on a display device. The method also includes a step of accepting a scrolling operation of the screen displayed on the display device and controlling the scrolling of the screen, and in the case in which there are a cell that is excluded from a visible region displayed on the display device and a cell that is newly included in the visible region, causing the cell that is included in the visible region to be displayed on the display device in a way that a content of an attribute, including location information, of a display element used to display the cell that is excluded from the visible region is modified to a content for displaying the cell that is included in the visible region.

Further, the present invention is implemented as a program causing a computer to function as the above system, and a program for causing a computer to execute processing corresponding to each of the steps in the above method. The program may be provided by storing in a storage medium such as a magnetic disk, an optical disk, or a semiconductor memory.

BRIEF DESCRIPTION OF THE DRAWINGS

For a more complete understanding of the present invention and the advantage thereof, reference is now made to the following description taken in conjunction with the accompanying drawings.

FIG. 4($a$) and FIG. 4($b$) are diagrams showing a state in which a visible region is scrolled in the present embodiment.

FIG. 7 is a diagram showing a state in which the visible region in FIG. 6 is superimposed onto the spreadsheet in FIG. 5.

FIG. 12 is a diagram showing a Pseudocode written in Javascript™, of a program for obtaining the maximum value of the number of rows included in the visible region, with respect to the row direction.

FIG. 14 is a diagram showing a configuration example of a spreadsheet including a concatenated cell.

DETAILED DESCRIPTION OF THE INVENTION

Hereinafter, an embodiment of the present invention will be described in detail, with reference to the accompanying drawings.

<System Configuration>

Figure 1:
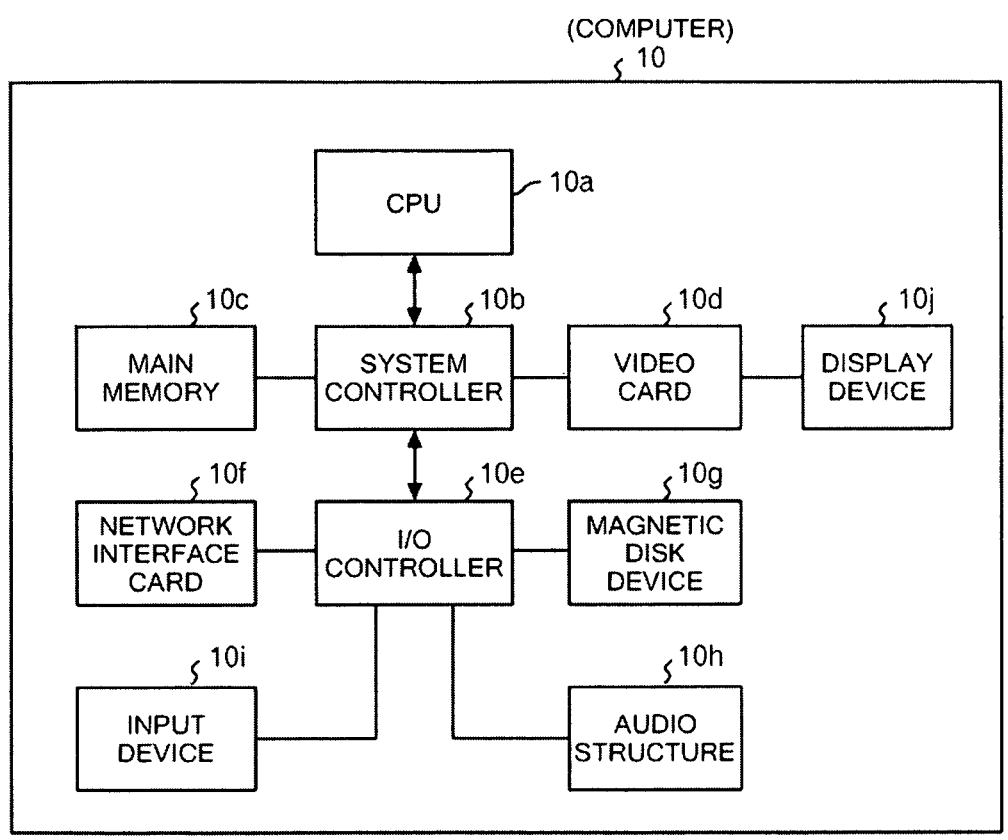
FIG. 1 is a diagram showing a hardware configuration example of a computer implementing a system to which the present embodiment is applied.

An application execution system according to the embodiment is implemented by a computer such as a personal computer. FIG. 1 is a diagram showing an exemplary hardware configuration of a computer 10 implementing the system of the embodiment.

A computer 10 shown in FIG. 1 includes a Central Processing is Unit (CPU) 10$a$ which is an example of calculating means, a main memory 10$c$ which is an example of storage means, and a magnetic disk device (HDD: Hard Disk Drive) 10$g$. Additionally, the computer 10 includes a network interface card 10$f$ for connecting to an external device through a network, a video card 10$d$ for display output, and an audio structure 10$h$ for audio output. Moreover, the computer 10 includes input devices 10$i$ such as a keyboard and a mouse.

As shown in FIG. 1, the main memory 10$c$ and the video card 10$d$ are connected to the CPU 10$a$ through a system controller 10$b$. In addition, the network interface card 10$f$, the magnetic disk device 10$g$, the audio structure 10$h$, and input devices 10*i* are connected to the system controller 10*b* through an I/O controller 10*e*. The components are connected by various buses such as a system bus and input and output buses. For example, the CPU 10*a* and the main memory 10*c* are connected by a system bus and a memory bus. Additionally, the magnetic disk device 10*g*, the network interface card 10*f*, the video card 10*d*, the audio structure 10*h*, the input devices 10*i*, and the like are connected to the CPU 10*a* by input and output buses such as Peripheral Components Interconnect (PCI), PCI express, Serial ATA (AT Attachment), Universal Serial Bus (USB), Accelerated Graphics Port (AGP) and the like.

Incidentally, FIG. 1 is a mere example of a hardware configuration of a preferable computer to which the embodiment is applied, and the configuration of each server is not limited to those shown in FIG. 1, as a matter of course. For instance, instead of the video card 10*d*, a video memory may simply be loaded so that image data may be processed by the CPU 10*a*. In addition, instead of providing the audio structure 10*h* as an individual component in the configuration, the structure may be included as a function of a chipset constituting the system controller 10*b* or the I/O controller 10*e*. Other than the magnetic disk device 10*g*, various drives for media such as an optical disk and a flexible disk may be provide as an auxiliary storage device. While a liquid crystal display is mainly used as the display device 10*j*, an arbitrary display may otherwise be used, such as a CRT display, a plasma display or the like.

Figure 2:
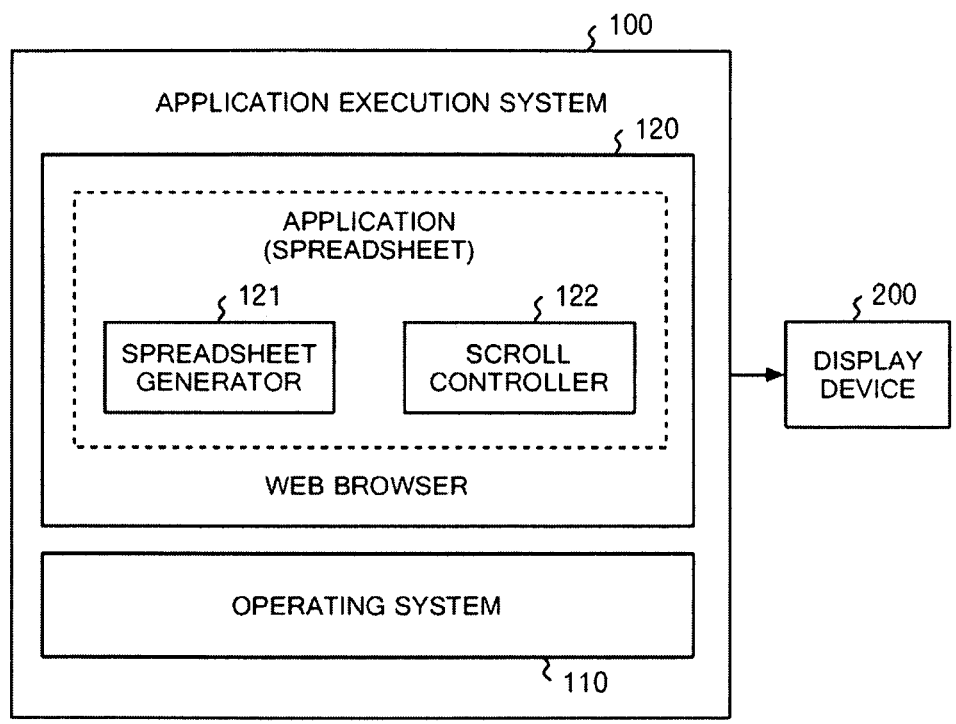
FIG. 2 is a diagram showing a functional configuration of an application execution system according to the present embodiment.

FIG. 2 is a diagram showing a functional configuration of an application execution system 100 of the embodiment.

An application execution system 100 shown in FIG. 2 is implemented by the CPU 10*a* executing a program loaded to the main memory 10*c* in the computer 10 in FIG. 1. The application execution system 100 includes an operating system (abbreviated as OS below) 110 and a web browser 120 operating on the OS 110. The web browser 120 includes a spreadsheet generator 121 and a scroll controller 122. The spreadsheet generator 121 and scroll controller 122 are written in DHTML or JavaScript™, operate on the web browser, and are implemented as a function of an application (spreadsheet) provided online from an unillustrated web server. The spreadsheet screen of the application is displayed on a display device 200 by a function of the web browser 120. In other words, the web browser 120 also functions as a display unit for displaying the spreadsheet screen on the display device 200. The display device 200 is implemented by the display device 10*j* in FIG. 1, for example.

<Functions of Spreadsheet Generator>

At the startup of the application, the spreadsheet generator 121 generates a screen element of a spreadsheet configured of a group of cells. In other words, the spreadsheet generator 121 is a screen generator for generating a spreadsheet screen in a grid form. Instead of a TABLE element and a table-related specific element group being child elements thereof, the spreadsheet generator 121 uses a style attribute related to a box model with a Cascading Style Sheet (CSS) function, to display cells of a spreadsheet. A box model is provided to define a style attribute as a rectangular region which is common to various display elements.

A style attribute is specified in association with a display element on which the attribute becomes effective. For example, a style attribute may be assigned to a DIV element which does not have a specific display form. Thus, a rectangular region in which a frame (border), a color of the frame, a cell size and a background color are expressed may be displayed as a cell of a spreadsheet. Although elements other than a DIV element may be used to configure a cell, an exemplary case of using a DIV element will be described below.

A spreadsheet in which cells are separated in a grid can be displayed by arranging multiple DIV elements as child elements of a parent display element (the parent element may also be a DIV element, for example) in a matrix. Since a DIV element can further include a child element, display by an appropriate element may be placed inside each cell of a spreadsheet as a child element of the DIV element.

In the box model according to CSS, a positional relationship between a box of a parent display element and that of a child element can be specified by use of a position attribute. In particular, a display position of a child element can be specified on a coordinate system regarding the upper left point of the box of the parent display element as a reference, by specifying "absolute" as the position attribute value of the child element, and assigning the actual positional attribute thereof.

Figure 3:
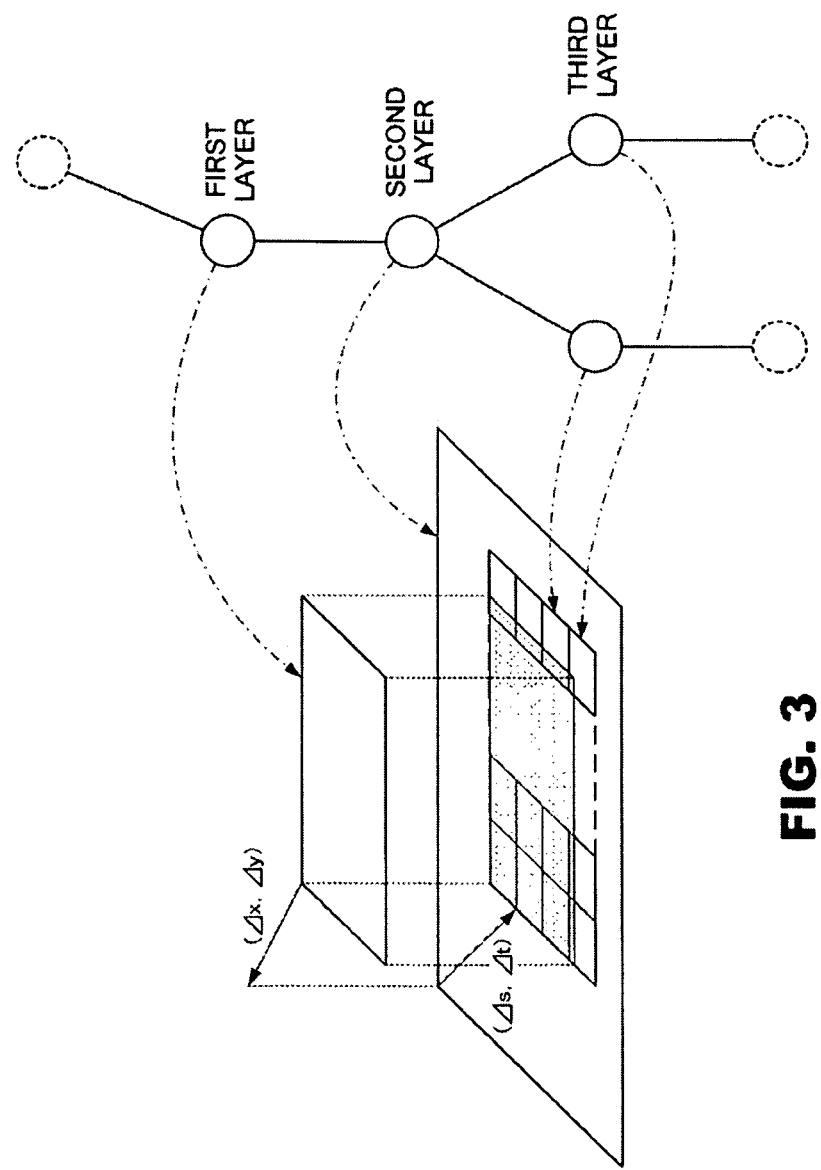
FIG. 3 is a diagram showing an example of a DOM structure for implementing a spreadsheet according to the present embodiment.

FIG. 3 is a diagram showing an example of a DOM structure for implementing a spreadsheet.

In the example in FIG. 3, the DOM structure constituting a spreadsheet is configured with three layers: a visible region display element (first layer), a cell plane display element (second layer), and a cell display element (third layer). As the visible region display element of the first layer, the size of a part currently displayed on the screen (visible region) of the spreadsheet is specified. The visible region display element appears as a part of a higher-layer element on the screen.

As the cell plane display element of the second layer, a coordinate system for determining the location of a group of cell display elements of the third layer is defined. In the example in FIG. 3, the location of the second cell from the top on the left edge is indicated by a coordinate ($\Delta s$, $\Delta t$).

As the cell display element of the third layer, individual cells constituting the spreadsheet are defined.

Here, a scrolling operation corresponds to changing the positional relationship between the visible region set in the first layer and the cell plane set in the second layer. In the example in FIG. 3, the location of the cell plane relative to the visible region is indicated by a coordinate ($\Delta x$, $\Delta y$). In addition, the shaded part of the cell plane in FIG. 3 indicates the part displayed on the screen.

Assume that information such as size, background color, content and the like on every cell in the spreadsheet is obtained from the web server that provides the application by the web browser 120, and is loaded to a memory region of the main memory 10*c* in FIG. 1, or the like. The web browser 120 may also be configured to transmit a request to the web server according to need, to obtain necessary information. For instance, assume that a two-dimensional array of cells is prepared, and that access to information in a cell of the i-th row of the j-th column is expressed as cell [i] [j]. In this case, the width of the cell, for example, is obtained by evaluating an expression such as cell [i] [j] width.

When generating the initial screen, the spreadsheet generator 121 generates the visible region display element and the cell plane display element, as well as generating enough numbers of cell display elements and their descendants to fill the visible region. Here, any of the following policies may be employed in determining the number of cell display elements to be generated.

(i) Obtain the number of rows and columns necessary to fill the visible region, and generate cell display elements for the number of cells included within this range.

(ii) Determine the number of rows and columns included in each visible region while scrolling the whole spreadsheet, and generate cell display elements for the product of the maximum values thereof.

The policy (i) is a policy in which the number of cell display elements is not increased unless necessary. Meanwhile, with the policy (ii), addition of a necessary cell display element does not occur in the middle of scrolling, unless the size of the visible region is changed. Hence, processing time for addition of a display element is unnecessary during scrolling of the screen. Accordingly, processing amounts for each scrolling unit take a constant value.

<Functions of Scroll Controller>

The scroll controller 122 carries out scrolling of the screen in response to a scroll operation by a user through the input device 10*i* of FIG. 1. Scrolling of a screen is carried out by changing the position of the cell plane relative to the visible region. To scroll the visible region to the right means that the position of a base point of the cell plane relative to the visible region moves to the left. The same concept may be applied to cases of scrolling the visible region to the left, up, and down.

FIG. 4(*a*) and FIG. 4(*b*) are diagrams that illustrate how the visible region is scrolled to the right.

When the visible region is scrolled for a certain width, some columns that were included in the visible region before the scroll are excluded from the visible region. These will be referred to as deleted columns. The number of deleted columns that occur is zero, one, or multiple columns. In the example in FIG. 4(*a*), the position of a base point of the cell plane moves from ($\Delta x1$, $\Delta y$) to ($\Delta x2$, $\Delta y$) by the scrolling of the screen, and thereby a column on the left is excluded from the visible region to become a deleted column.

Additionally, a portion is generated from the region that has newly become the visible region, where cell display elements are not yet allocated. These will be referred to as added columns. The number of added columns that occur is zero, one, or multiple columns. When there are more added columns than deleted columns, the scroll controller 122 selects the added columns of the number of the difference of the added and deleted columns, and newly generates cell display elements to be allocated on the selected columns. Then, the scroll controller 122 sets necessary attributes including positional attributes to each of the generated cell display elements.

As for the remaining added columns (the added columns of the same number as the deleted columns, but only the case of 1 or more), the scroll controller 122 sets necessary attributes including positional attributes, in order to re-allocate the respective cell display elements that were on the deleted columns to the added columns. Then, the cell display elements on the deleted columns are actually re-allocated to the added columns. In other words, with respect to the added columns of the same number as the deleted columns, instead of newly generating the cell display elements, cell display elements are allocated by moving existing cell display elements, as shown in FIG. 4(*b*). While a relatively long processing time is required for generating a cell display element, such reuse of existing cell display elements can reduce the processing time.

Moreover, each of the cell display elements is allocated to correspond to the same row as before the moving. In this way, attributes of cells set for each row (such as the case in which height and background color are set for each row) need not be reset, and thus processing time can be further reduced.

As described above, as scroll processing, the scroll controller 122 obtains the cell display elements allocated to the deleted columns excluded from the visible region, and carries out an operation to modify the attributes thereof. Accordingly, an efficient data structure needs to be designed, in order to obtain the cell display elements of specific rows and columns corresponding to locations of rows and columns of the cell display elements at each time point. In addition, an efficient data structure is required for storing positional relationships after modification, when a modification is made in the locations of cell display elements by units of rows or columns.

A method may be assumed in which rows and columns are expressed with an array in JavaScript™ (one-dimensional array), and a group of them is expressed with a higher-level array whereby configuring a two-dimensional array corresponding to a matrix. The cell display elements allocated to specific rows and columns can be stored by use of this matrix. For example, assuming that the name of the array is cells, the locations of the 100th row and the 500th row are expressed as cells [100] [500], respectively. A cell display element is stored or accessed by a substitution operation or an access operation to the array, respectively. Generally, an array index requires an extremely large number of values to express locations of an entire spreadsheet. However, an array in Javascript™ is the so-called associative array using numbers to represent the index. Hence, even if a large number of numeric values are needed to represent the index, no actual storage region is required for a cell that does not include an array element. Accordingly, this array is a sufficiently efficient data structure regarding both access performance and storage region.

<Concrete Example of Operations of Spreadsheet Generator and Scroll Controller>

Next, a more detailed description will be given of operations of the spreadsheet generator 121 and the scroll controller 122 by use of a concrete example of a spreadsheet configuration.

Figures 5, 6:
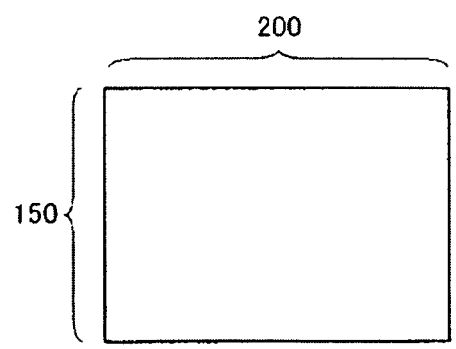
FIG. 5 is a diagram showing a configuration example of a spreadsheet used in the present embodiment.
FIG. 6 is a diagram showing an example of a size of a visible region on a spreadsheet.

FIG. 5 is a diagram showing a configuration example of a spreadsheet.

In FIG. 5, the numbers on the upper side and left side of the spreadsheet respectively show the width of each column and height of each row. In addition, assume that C (i, j) assigned to each cell is a name given to the cell. Although the sizes are described only for the three rows and four columns of the upper left part of the spreadsheet in the example, the cells actually continue in the unillustrated right and lower direction. Moreover, in addition to the sizes, data necessary for displaying cells, such as data, foreground color, background color and the like are stored in association to C (i, j) of each cell in the memory.

FIG. 6 is a diagram showing an example of a size of a visible region of a spreadsheet.

Suppose that the values of the size of the visible region in FIG. 6 are of the same unit as the values of the sizes of the rows and columns of the spreadsheet in FIG. 5.

Figure 7:
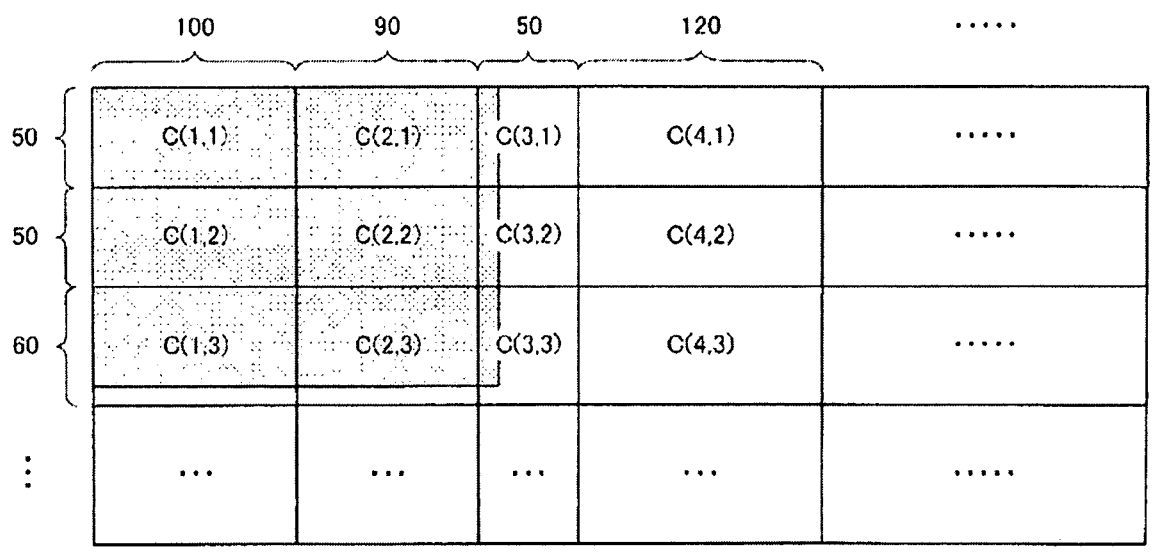

FIG. 7 is a diagram showing the state in which the visible region in FIG. 6 is overlapped on the spreadsheet in FIG. 5. In the drawing, the shaded portion indicates the visible region.

As can be seen in FIG. 7, assuming that the screen is displayed from the left upper corner of the spreadsheet, three rows and three columns on the upper left side are included in the visible region in this example.

With the conditions as described above, the spreadsheet generator 121 generates the three-layered DOM structure formed of DIV elements, described in reference to FIG. 3, to display the visible region of the spreadsheet.

In the DIV element of the first layer, at least the width and height of the visible region is set as the style attribute. This setting is expressed as follows:

DIVp. style="width: 200; height: 150".

This description indicates that the width attribute width is 200 and the height attribute height is 150 as style attributes of DIVp, which is the DIV element of the first layer. Note that these attribute names including those mentioned below are based upon basic web browser style sheet technique.

Next, the style attribute of DIVm being the DIV element of the second layer is set as follows:

DIVm. style="position: absolute; overflow: visible; left: 0; top: 0; width: 0; height: 0".

This description indicates that the value of the position specification attribute position is absolute, indicating that the position of this element is specified by a coordinate regarding the upper left corner of the parent element as a reference. The value of an overflow attribute overflow is visible, indicating that if a child element of this element is located in a position exceeding the width and height range of DIVm, the element is to be treated visibly. As for the position, left is zero and top is also zero, indicating that the upper left point of this element coincides with the upper left point of the parent element. Width and height may take arbitrary values, and are both set to zero in this example. Since the overflow attribute is set to visible, the child element is displayed regardless of the size of DIVm.

In order to display the current visible region thoroughly, nine elements are generated for the group of DIV elements of the third layer. The respective DIV elements are given names DIV1 to DIV9.

Figure 8:
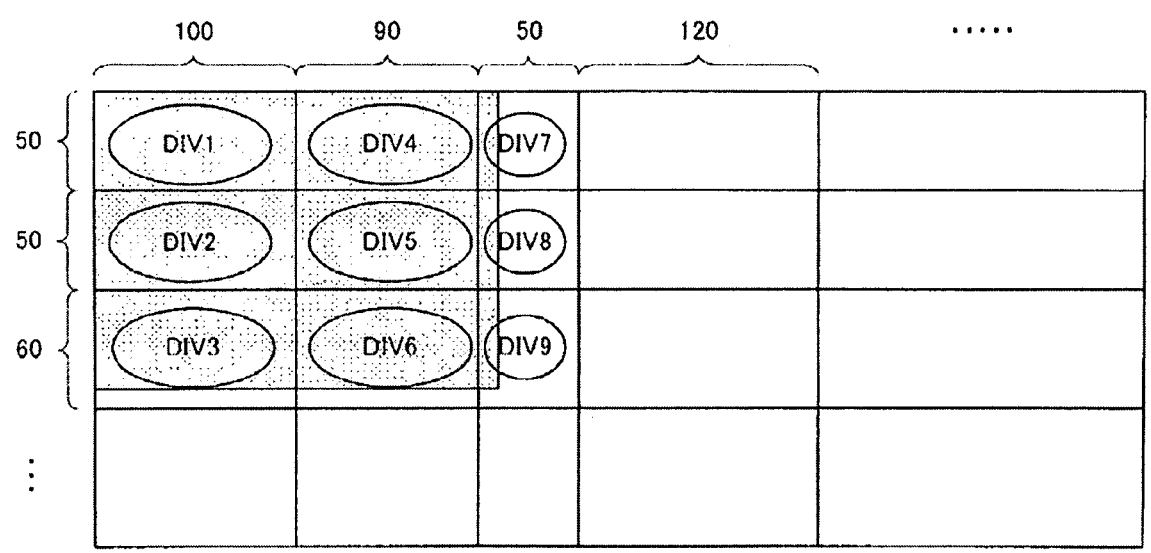
FIG. 8 is a diagram showing an exemplary allocation of DIV elements on the spreadsheet in FIG. 7.

FIG. 8 shows an exemplary allocation of the DIV elements.

Assuming that the value of the position specification attribute position is absolute, the style attribute of each DIV element is specified by a position from the parent, that is, the upper left point of DIVm. Attributes left and top which are attributes specifying the location are calculated from information on the height and width of the rows and columns to be set. For instance, the style attribute of DIV5 is left: 100; top: 50; width: 90; height: 50. Additionally, the display of each cell is completed by setting, for each cell, style attributes such as color and font as well as child elements for data display, to the group of DIV elements of the third layer.

Next, assume that the spreadsheet thus generated is scrolled to the right for a column, that is, for 100.

Figure 9:
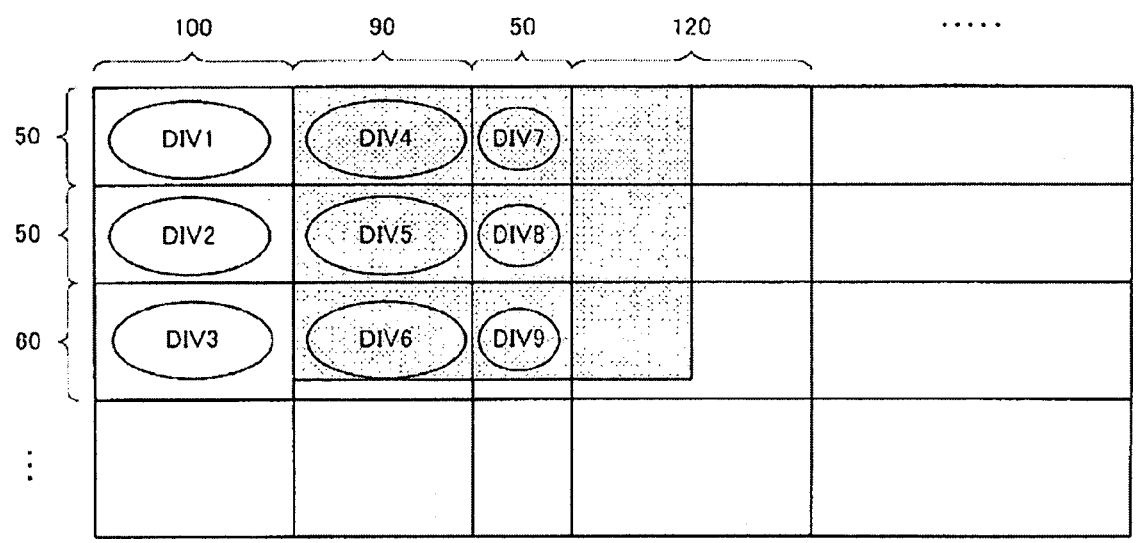
FIG. 9 is a diagram showing a positional relationship between the new visible region after scrolling and the positions of the current DIV elements in the third layer.

FIG. 9 is a diagram showing a relationship between the new visible region after the scroll and the current position of the DIV elements of the third layer.

As can be seen in FIG. 9, the position of the DIV elements included in the first column (left edge) before the scroll is completely excluded from the visible region after the scroll. Meanwhile, the DIV elements in the second and third columns are also included in the new visible region. Currently, the cells in the fourth column are not assigned any DIV elements. Here, the new visible region can be displayed thoroughly if the second, third and fourth columns can be displayed. Accordingly, the following operation is carried out to form the display after the scroll.

The scroll controller 122 firstly modifies the left attribute from 0 to −100 for DIVm of the second layer. With this operation, the position of the second layer relative to the first layer is shifted for 100 to the left. This indicates that the second layer is shifted for 100 to the right if the visible region of the first layer is regarded as a reference. Then, the scroll controller 122 modifies the left attribute to 240 and the width attribute to 120, for each of DIV1, DIV2, and DIV3 of the third layer. Moreover, the scroll controller 122 newly sets, for each of these elements, style attributes necessary for displaying the cell and child elements for displaying data.

Figure 10:
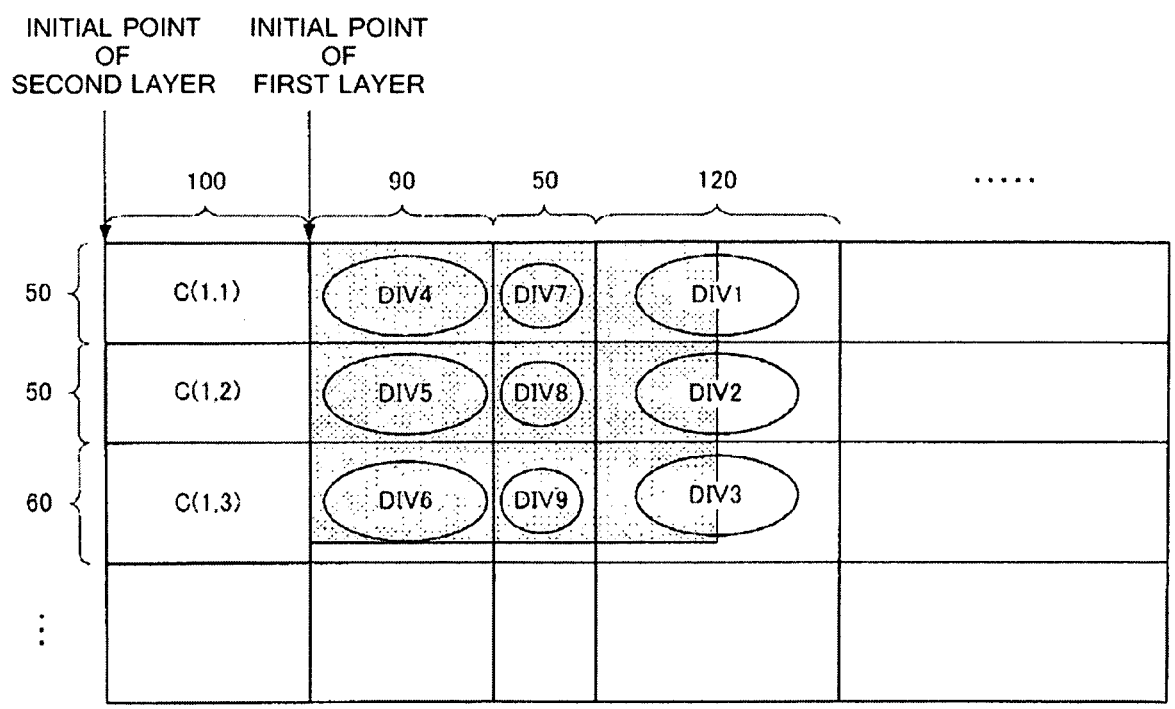
FIG. 10 is a diagram showing a final positional relationship among the visible region of the first layer, and the DIV elements of the second and third layers.

FIG. 10 is a diagram showing the final visible region of the first layer and positional relationships between the DIV elements of the second and third layers after the above operation.

In the above operation, no modification is made for DIV4 to DIV9 in their attributes including positions thereof and their lower-layer structures. In addition, no new DIV attribute is added in the third layer. These points are effective in reducing processing time of a scroll, particularly when there are a large number of cells displayed in a spreadsheet. Generation of new DIV attributes in the third layer is required if there is not enough DIV elements to fill the visible region. However, existing DIV elements can be reused in many cases in which the DIV elements of the third layer are generated largely in advance, or after the addition of a considerable number of DIV elements.

Figure 11:
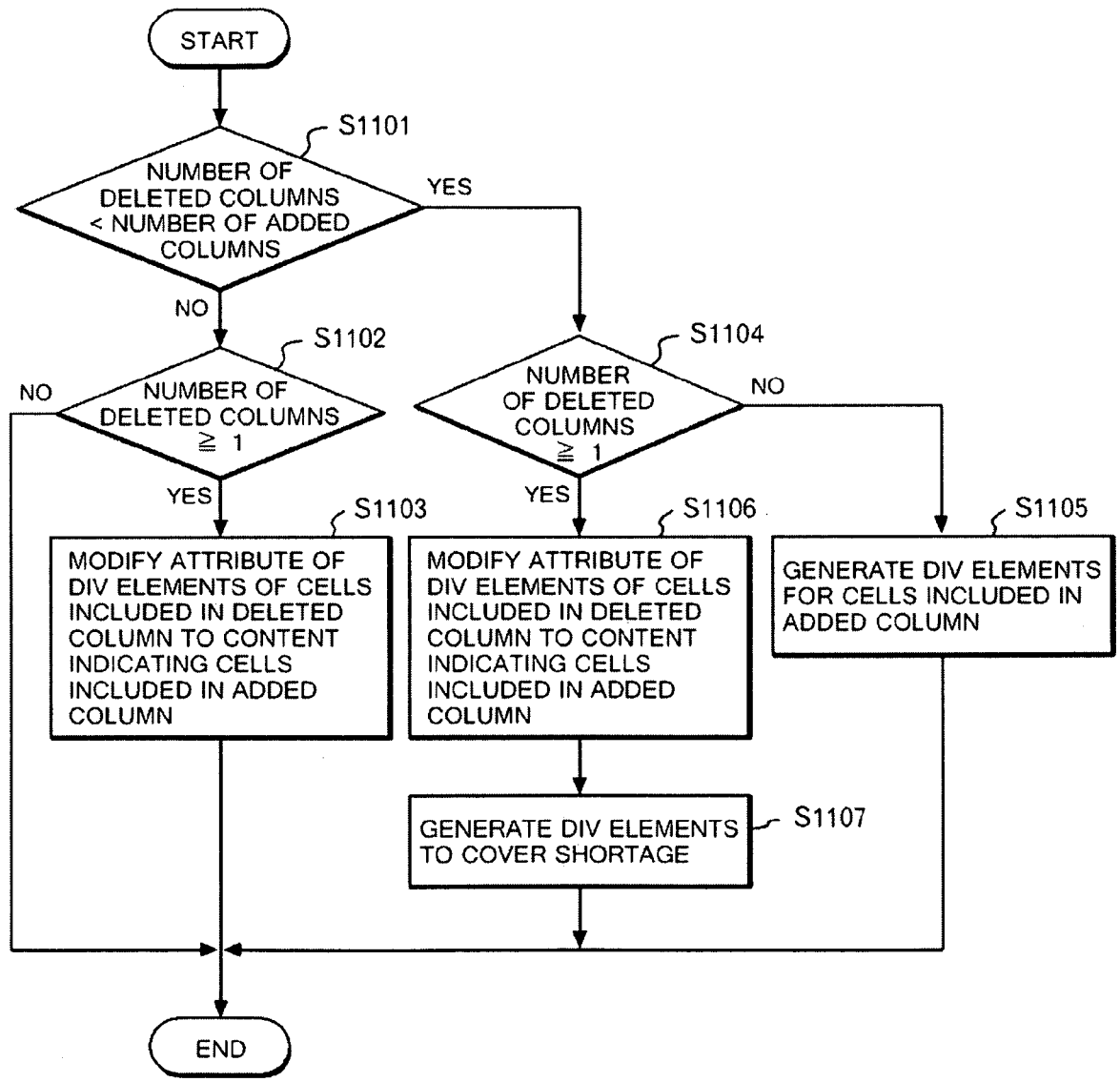
FIG. 11 is a flowchart illustrating the flow of processing by a scroll controller of the present embodiment.

FIG. 11 is a flowchart illustrating the flow of processing by the scroll controller 122.

As shown in FIG. 11, the scroll controller 122 first compares the number of deleted columns and added columns after carrying out a scrolling operation. In the case in which the number of deleted columns is not less than the number of added columns (No in step 1101), if the number of deleted columns is zero (that is, if the deleted column and added column are both zero), the cells included in the visible region to be displayed do not change by the scroll, and thus the scroll controller 122 terminates the processing (No in step 1102).

Meanwhile, if the number of deleted columns is not less than one (Yes in step 1102), the scroll controller 122 changes the attribute of each DIV element in the deleted column to a content indicating an added column (step 1103). With this operation, the DIV elements used to display the deleted columns come to be used to display the added columns.

In the case in which the number of added columns is larger than the number of deleted columns (Yes in step 1101), if the number of deleted columns is zero (No in step 1104), DIV elements are required for the cells of the added columns, and thus the scroll controller 122 generates the required number of DIV elements (step 1105). The generated DIV elements are used to display the cells of the added columns.

Meanwhile, if the number of deleted columns is not less than one (Yes in step 1104), the scroll controller 122 changes the attribute of each DIV element in the deleted column to a content indicating an added column (step 1106). However, since this is not enough to display all of the cells in the added columns, the scroll controller 122 generates DIV elements to cover the shortage (step 1107). Then, the DIV elements used to display the deleted columns and the DIV elements newly generated to cover the shortage are used to display the added columns.

Note that although the above operation example has been described for the case in which columns of the spreadsheet are deleted and added by scrolling, the same processing is applied for a case in which rows of the spreadsheet are deleted and added by scrolling in another direction. Additionally, although not shown in the flowchart, if more columns are deleted than added, some DIV elements are left without being used for display of added columns. In this case, the excess DIV elements may be assigned to cells of a column yet to be displayed, located in the extended direction of the scrolling. In this way, DIV elements need not be newly generated when this column is displayed after further scrolling operation is carried out. Alternatively, the excess deleted columns (DIV elements) may be reserved without modification. The excess deleted columns are regarded as a part of deleted columns at the time of the next scroll in the same direction. With this method, the processing amount at the time of scrolling can be kept at a minimum level, while the modification amount needed for scrolling in the opposite direction can be reduced.

<Generation of Cell Display Elements in Initial Display>

Addition of cell display elements in the middle of scrolling causes time consumption for processing thereof, which slows down the scrolling speed. If the spreadsheet generator 121 previously generates a larger number of cell display elements than required, such addition of elements is less likely to occur. In order to prevent such addition of elements completely, the number of rows and columns included in each visible region should be determined while scrolling the entire spreadsheet. Thereafter, cell display elements of the maximum number of the determined number of rows and columns should be generated and allocated at the time of initial display (policy (ii) described in the functions of the spreadsheet generator 121). The number of rows and columns to be included in the visible region is obtained by calculation based on information on the size of the visible region and the size of each cell, not by actually generating cell display elements. Note that this operation is carried out under the assumption that the definition of cell size and the size of the visible region of the spreadsheet remain unchanged.

FIG. 12 is a diagram showing a Pseudocode written in JavaScript™, of a program for obtaining the maximum value of the number of rows included in the visible region in the row direction. Although a program regarding the row direction is described in FIG. 12, the same calculation may be used for the column direction.

In the exemplary program shown in FIG. 12, scrolling is sequentially carried out by units of a single row, the required number of rows for filling the visible region at each time point is obtained, and the maximum value thereof is obtained. In the case of scrolling by row units, the maximum value of the required rows can be obtained with this program. Meanwhile, in the case in which scrolling can be carried out by units smaller than row units, the maximum value of the number of rows to fill the visible region is only a value 1 larger than the maximum value which is calculated by use of this program. Accordingly, the maximum value of the number of rows can also be obtained by applying this program in such a case.

If the thus calculated maximum numbers of rows and columns required for display result in large numbers, the processing amount in the initial state increases, and startup delay time of the initial screen could be increased. It should be determined while designing whether: to give priority to the initial startup time and accept the delay caused from generating cell display elements during the scrolling; to sacrifice the initial startup time and eliminate any delay during the scrolling; or to perform adjusting between the two so that the delay can be dispersed between the initial processing the scrolling time.

<Handling Concatenated Cell>

Normally, advanced grid display components and spreadsheets include functions for handling concatenated cells. A concatenated cell is a group of cells designated by ranges of rows and columns, to be collectively displayed as a single cell. Information to be displayed in the concatenated cell is associated with one of the cells before the concatenation (such as the cell in the upper left corner). Each of the cells designated as the range of the concatenated cell is referred to as a concatenation element.

A processing method for the case in which a concatenated cell is included is achieved by extending the above processing which does not consider concatenated cells. Consider a situation of designating, for each cell display element, width, height, and a location from the cell plane display element, for the time of generating the initial screen, and for the time of scrolling. If concatenated cells need not be considered, the width and height of the cell display element is obtained from information on the corresponding cell, and the location thereof is determined by positional relationships with surrounding cells and sizes of the surrounding cells.

Meanwhile, in the case of considering concatenated cells, the processing method is expanded in the following manner. Firstly, if the cell is not a concatenation element in the above situation, the same processing as described above is carried out. In contrast, if the cell is a concatenation cell, it is determined, by a later-described method, whether the cell display element is a representative display element or another display element. If the element is a representative display element, the display size is the size of the concatenated cell including the corresponding elements. Additionally, the display location is set to the upper left corner of an element in the upper left position of the concatenation elements included in the concatenated cell. If the element is a display element other than the representative display element, the display size is set to zero (or any method may be used as long as the element is hidden). A representative display element in a concatenated cell is an element located at the upper left corner of current display concatenation elements in the concatenated cell.

The determination on whether a certain cell display element is a representative display element is made in the following manner.

(1) If the cell display element is located at the upper left corner among all of current cell display elements, the element is a representative display element.

(2) Cases other than (1), in which if the cell display element is in the leftmost column of all of current cell display elements, and is in the uppermost row of the concatenation elements in the concatenated cell including the corresponding cell, the element is a representative display element.

(3) Cases other than (1) or (2), in which if the cell display element is in the uppermost row of all of current cell display elements, and is in the leftmost column of the concatenation elements of the concatenated cell including the corresponding cell, the element is a representative display element.

(4) Cases other than (1), (2) or (3), in which if the cell display element is located at the upper left corner of the concatenation elements in the concatenated cell including the corresponding cell, the element is a representative display element.

(5) If none of the above applies, the cell display element is not a representative display element.

At the time of displaying the initial screen, the spreadsheet generator 121 specifies the size and location of every cell display element in the aforementioned manner. At the time of scrolling the screen, from left to right, for example, the scroll controller 121 specifies, in the aforementioned manner, the size and location of each of newly generated cell display elements and cell display elements included in the deleted columns whose locations are to be modified. Additionally, when cell display elements in certain deleted columns are moved, the scroll controller 121 resets, in the aforementioned manner, the size and location of every cell display element included in the column which has become the leftmost column. Processing is carried out in a similar manner in the case of scrolling the screen in another direction.

Figure 13:
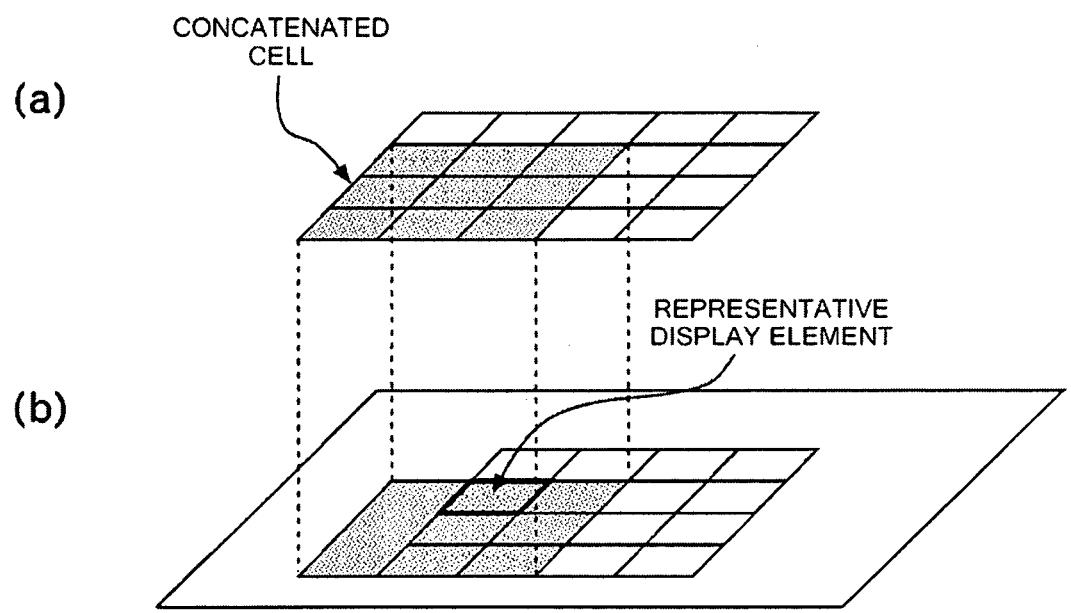
FIG. 13($a$) and FIG. 13($b$) are schematic diagrams showing a relationship between a definition of cells and display elements in the present embodiment.

FIG. 13(a) and FIG. 13(b) are schematic views illustrating a relationship between a definition of cells and display elements. FIG. 13(a) shows the positional relationship of cell information such as the sizes of the cells and a definition of a concatenated cell (information). FIG. 13(b) shows a relationship between the definition of these cells and the display elements.

Among the cell display elements, the one which corresponds to a concatenation element and which is located in the upper left corner is a representative display element (DIV element indicated by a bold line in FIG. 13(b)). The representative display element is selected every time the screen is scrolled, and the size and location thereof is reset. The size and location of the representative display element is set as the shaded portion in FIG. 13(b), that is, the portion equivalent to the size and location of the concatenated cell. In the case in which an element is no longer a representative display element after a scrolling operation but still is a concatenation element, the size of the element is set to zero.

<Concrete Example of Handling Concatenated Cell>

Next, a more detailed description will be given for handling concatenated cells, by use of a concrete configuration example of a spreadsheet.

FIG. 14 is a diagram showing a configuration example of a spreadsheet including a concatenated cell.

The spreadsheet shown in FIG. 14 has the same configuration as that shown in FIG. 5, except that cells C (1, 1), C (1, 2), C (2, 1) and C (2, 2) are concatenated and a region including the four cells is handled as a concatenated cell. Assume that such concatenation information is stored in the memory in association with each of the cells in the concatenated cell so that the size of the concatenated cell can be calculated. Also assume that style information other than display data and size of the concatenated cell is stored in association with each of the cells by appropriate means, and can be obtained and calculated in the processing of displaying the spreadsheet. The shaded portion in FIG. 14 indicates the visible region.

Suppose that the initial display is carried out by regarding the upper left point of the spreadsheet as a reference. In this case, firstly DIV1 to DIV9 are generated so as to correspond to cells necessary to fill the display region, as DIV elements in the third layer.

Figure 15:
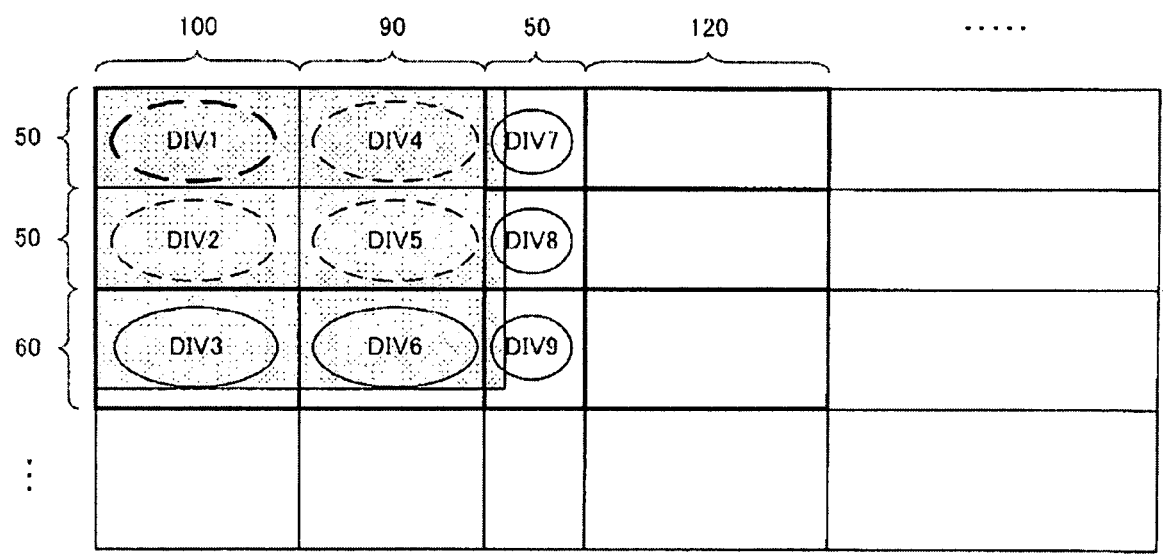
FIG. 15 is a diagram showing an exemplary allocation of DIV elements on the spreadsheet in FIG. 14.

FIG. 15 shows an exemplary allocation of the DIV elements.

Since the concatenated cell is included in the screen, one of the DIV elements corresponding to the cells handled as a concatenated cell, that is, DIV1 in this example, is chosen as the representative display element. In FIG. 15, the DIV elements constituting the concatenated cell are indicated by a broken line, and the representative display element is indicated by a thick broken line.

In the spreadsheet shown in FIG. 15, attributes such as location and size are normally set for the DIV elements corresponding to the cells other than the concatenated cell.

Meanwhile, attributes such as location, size and the like of the concatenated cell is set for the representative display element of the concatenated cell. In the example in FIG. 15, the location and size are set as left: 0; top: 0; width: 190; height: 100. As for the elements DIV2, DIV4 and DIV5 which correspond to cells in the concatenated cell but are not a representative display element, attributes are set so that the sizes are zero, for example, in order for the elements to be hidden. As a result, the portion of the concatenated cell is displayed as a single large cell.

Next, consider a case in which this spreadsheet is scrolled to the right for one column.

Figure 16:
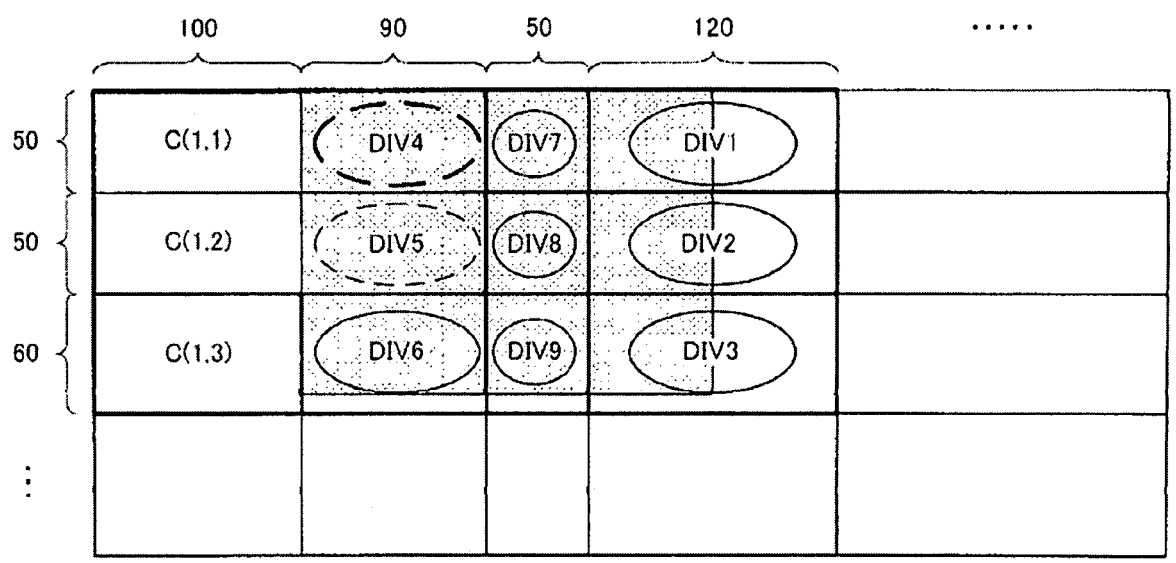
FIG. 16 is a diagram showing a state in which the spreadsheet in the state of FIG. 15 is scrolled to the right for one column.

FIG. 16 is a diagram showing a state of the spreadsheet having been scrolled to the right for one column from the state in FIG. 15.

Firstly, normal processing is carried out without considering the concatenated cell, by modifying the settings of the DIV1, DIV2 and DIV3 elements of the first column so as to display the fourth column. At this time, DIV1 is no longer used to display the concatenated cell.

Thereafter, the second column that has become the left end column is looked over to check whether or not any element being a part of the concatenated cell is included in this column. In this example, the concatenate cell is included in the second column. Since an element at the uppermost and leftmost portion in a cell region displayed as a part of a concatenated cell is defined as a representative display element, DIV4 among DIV4 and DIV5 that correspond to the concatenated cell region is the representative display element. The location and size of DIV4 is set as left: 0; top: 0; width: 190; height: 100. The size of DIV5 is set to be zero so as to be hidden. As a result, only the right side of the concatenation cell appears on the left end of the visible region after the scrolling of the screen.

In the above operation, the following processing is added to normal processing. That is, a representative display element is selected from the column (row, in the case of vertical scrolling) that has moved to the edge after scrolling, and an appropriate location and size is set for the representative display element and each of the other surrounding DIV elements. This additional processing is the only difference between the scroll processing performed for a spreadsheet with a concatenated cell and that with no concatenated cell. In other words, scroll processing for the case in which a concatenated cell is included can be achieved, merely by the simple extension mentioned above of the scroll processing for the case in which no concatenated cell is included.

For the sake of efficiency, whether or not a spreadsheet includes a concatenated cell may be stored at the time of specifying the concatenated cell or releasing the specification in the spreadsheet. Then, the processing method for scrolling may be switched in accordance with this stored information. With this configuration, the additional processing for a concatenated cell may be omitted if a spreadsheet does not include any concatenated cells.

Figure 17:
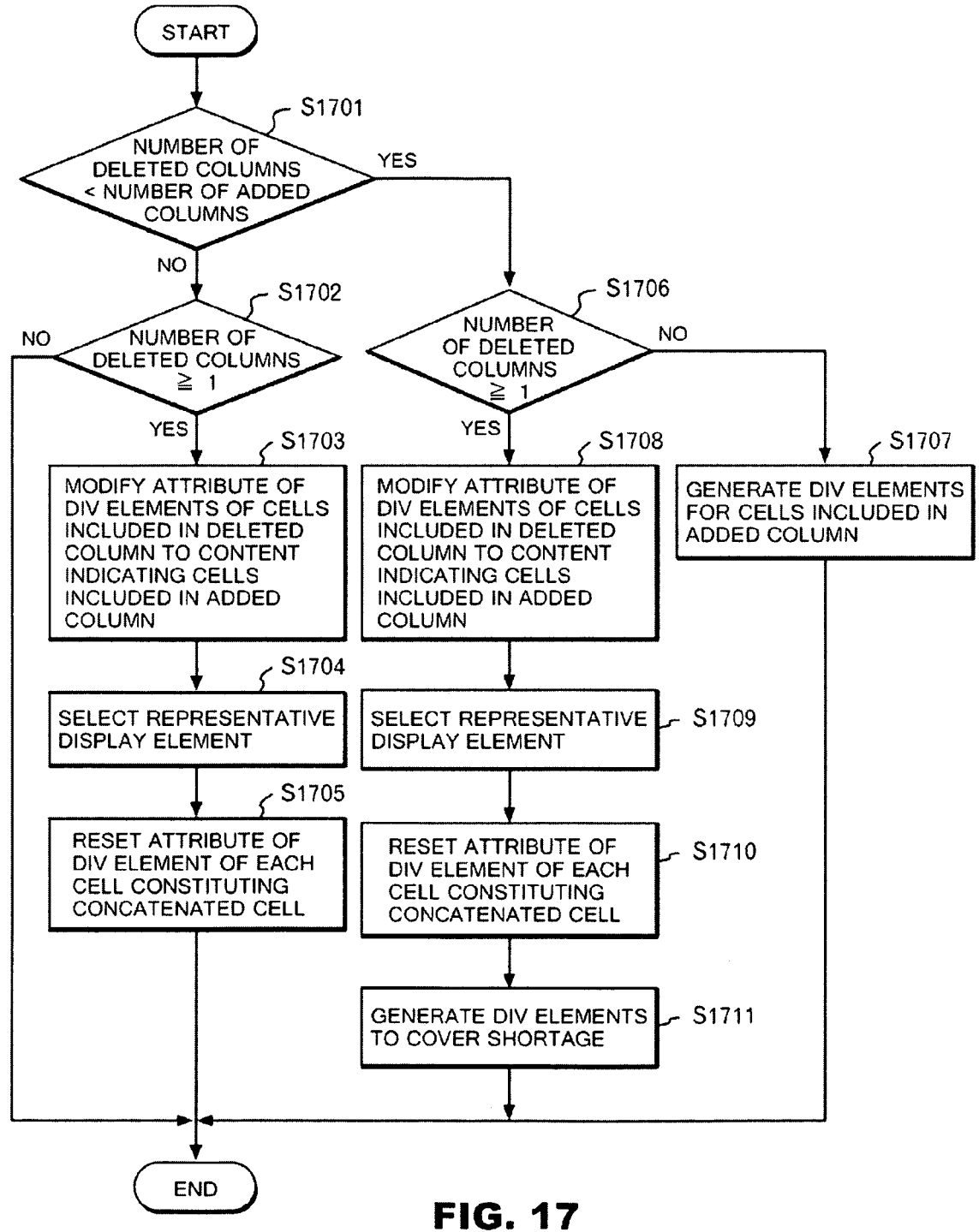
FIG. 17 is a flowchart illustrating the flow of processing by the scroll controller in the case in which a spreadsheet includes a concatenated cell.

FIG. 17 is a flowchart illustrating the processing by the scroll controller 122 in the case in which a spreadsheet includes a concatenated cell.

In FIG. 17, operations of steps 1701 to 1703 are the same as those of the steps 1101 to 1103 shown in FIG. 11. Additionally, operations of steps 1706 to 1708 and 1711 performed when the number of added columns is larger than the number of deleted columns (Yes in step 1701) are the same as those of the steps 1104 to 1107 in FIG. 11.

In this operation example, after modification of the attribute of the DIV element in step 1703, the scroll controller 122 detects the DIV elements of cells which constituted the concatenated cell before the scrolling and which is included in the visible region after the scrolling, and selects the representative display element (step 1704). Then, the scroll controller 122 resets the attribute of the DIV element of each cell constituting the concatenated cell within the visible region after the scrolling, to a content indicating the concatenated cell (step 1705).

Similarly, after the modification of the attribute of the DIV element in step 1708, the scroll controller 122 selects the representative display element (step 1709), and resets the attribute of the DIV element of each cell constituting the concatenated cell (step 1710). Note that although in the flowchart in FIG. 17, DIV elements are generated to cover the shortage (step 1711) after processing is performed on the concatenated cell (steps 1709 and 1710), the order of these steps are not limited to this example.

By employing the present invention having the configuration as described above, reduction of time required for initial display, and reduction of response time of the scrolling operation can be achieved, in controlling display of an application which provides a grid display.

Hereinabove, a description has been given of the present embodiment. However, the technical scope of the present invention is not limited to the scope described in the above embodiment. For instance, although an exemplary case has been described in which the application operating on the web browser 120 is a spreadsheet, the embodiment may be applied to various other applications employing a grid-form display. Moreover, although the embodiment has been described under the assumption that the application is provided online from a web server, the application is not limited to those provided online, as long as the application operates on the web browser 120. It is apparent from the scope of the invention that various modifications and improvements added to the above embodiment are also included in the technical scope of the present invention.

What is claimed is:

1. A system for executing an application which provides a grid display, comprising:
    a Central Processing Unit (CPU);
    a screen generator for generating a screen divided into a grid pattern comprising a group of display elements with associated cells;
    a display unit for displaying the screen generated by the screen generator on a display device, wherein at least a first cell having an associated display element is displayed; and
    a scroll controller for accepting a scrolling operation of the screen displayed on the display device and controlling the scrolling of the screen, wherein, in response to receiving the scrolling operation, the scroll controller:
        determines that the screen contains a concatenated cell comprising a plurality of cells from the associated cells, wherein the concatenated cell is handled as a single cell, and wherein contents from one of the plurality of cells is displayed in the concatenated cell;
        re-uses display elements of cells that are excluded from a visible region by modifying attributes of the display elements of the cells that are excluded to attributes of display elements of cells that are included in the visible region;
        detects display elements of cells from the concatenated cell before scrolling that are included in the visible region after the scrolling; and
        resets attributes of the detected display elements to contents for displaying a part of the concatenated cell to be displayed on the screen after the scrolling.

2. The system according to claim 1, wherein, if a number of cells included in the visible region is larger than a number of cells excluded from the visible region, the scroll controller generates new display elements of a number equal to a difference between the number of cells included and the number of cells excluded, and causes the cells included in the visible region to be displayed on the display device using the generated new display elements.

3. The system according to claim 1 wherein, if cells are arranged on the screen in a matrix and cells constituting at least one column are excluded from the visible region while cells constituting at least one column are newly included in the visible region as a result of another scrolling operation, the scroll controller re-uses display elements of the cells constituting the at least one column that is excluded from the visible region by modifying attributes of the display elements of the cells constituting the at least one column that is excluded from the visible region according to a correspondence between positions in a row direction of the cells constituting the at least one column that is included in the visible region and positions in the row direction of the cells constituting the at least one column that is excluded from the visible region.

4. The system according to claim 1 wherein, if cells are arranged on the screen in a matrix and cells constituting at least one row are excluded from the visible region while cells constituting at least one row are newly included in the visible region as a result of another scrolling operation, the scroll controller re-uses display elements of the cells constituting the at least one column that is excluded from the visible region by modifying attributes of the display elements of the cells constituting the at least one row that is excluded from the visible region according to a correspondence between positions in a column direction of the cells constituting the at least one row that is included in the visible region and positions in the column direction of the cells constituting the at least one row that is excluded from the visible region.

5. The system according to claim 1, wherein the screen generator calculates a maximum value of a number of cells to be displayed at once on the screen based on a size of the screen and a size of each of the cells, and wherein the screen generator generates the screen by generating the display elements of the number of cells specified by the calculated maximum value.

6. The system according to claim 1, wherein, if a first cell is excluded from a visible region displayed on the display device and a second cell is newly included in the visible region as a result of the scrolling operation, the scroll controller causes the second cell that is included in the visible region to be displayed on the display device by re-using the display element associated with the first cell for the second cell by modifying a content of an attribute of the display element that is used to display the first cell that is excluded from the visible region to a content of the attribute of the display element that is used to display the second cell that is included in the visible region, wherein the content of the attribute includes location information.

7. A method for controlling display of an application which provides a grid display by use of a computer, the method comprising:
    generating a screen divided into a grid pattern comprising a group of display elements;
    displaying the screen on a display device, wherein at least a first cell having an associated display element is displayed;
    accepting a scrolling operation of the screen displayed on the display device;
    determining that the screen contains a concatenated cell comprising a plurality of cells from the associated cells, wherein the concatenated cell is handled as a single cell, and wherein contents from one of the plurality of cells is displayed in the concatenated cell;
    re-using display elements of cells that are excluded from a visible region by modifying attributes of the display elements of the cells that are excluded to attributes of display elements of cells that are included in the visible region;
    detecting display elements of cells from the concatenated cell before scrolling that are included in the visible region after the scrolling; and
    resetting attributes of the detected display elements to contents for displaying a part of the concatenated cell to be displayed on the screen after the scrolling.

8. The method according to claim 7, further comprising:
if a number of cells included in the visible region is larger than a number of cells excluded from the visible region, generating new display elements of a number equal to a difference between the number of cells included and the number of cells excluded; and
displaying the cells included in the visible region on the display device using the generated new display elements.

9. The method according to claim 7, further comprising:
if cells are arranged on the screen in a matrix and cells constituting at least one column are excluded from the visible region while cells constituting at least one column are newly included in the visible region as a result of another scrolling operation, re-using display elements of the cells constituting the at least one column that is excluded from the visible region by modifying attributes of the display elements of the cells constituting the at least one column that is excluded from the visible region according to a correspondence between positions in a row direction of the cells constituting the at least one column that is included in the visible region and positions in the row direction of the cells constituting the at least one column that is excluded from the visible region.

10. The method according to claim 7, further comprising:
if cells are arranged on the screen in a matrix and cells constituting at least one row are excluded from the visible region while cells constituting at least one row are newly included in the visible region as a result of another scrolling operation, re-using display elements of the cells constituting the at least one column that is excluded from the visible region by modifying attributes of the display elements of the cells constituting the at least one row that is excluded from the visible region according to a correspondence between positions in a column direction of the cells constituting the at least one row that is included in the visible region and positions in the column direction of the cells constituting the at least one row that is excluded from the visible region.

11. The method according to claim 7, further comprising:
calculating a maximum value of a number of cells to be displayed at once on the screen based on a size of the screen and a size of each of the cells; and
generating the display elements of the number of cells specified by the calculated maximum value.

12. The method according to claim 7, further comprising:
in response to receiving the scrolling operation, if a first cell is excluded from a visible region displayed on the display device and a second cell is newly included in the visible region, displaying the second cell that is included in the visible region on the display device by re-using the display element associated with the first cell for the second cell by modifying a content of an attribute of the display element that is used to display the first cell that is excluded from the visible region to a content of the attribute of the display element that is used to display the second cell that is included in the visible region, wherein the content of the attribute includes location information.

13. A program stored in a storage medium, wherein the program, when executed by a Central Processing Unit (CPU) of a computer, causes the computer to:
generate a screen divided into a grid pattern comprising a group of display elements;
display the screen on a display device, wherein at least a first cell having an associated display element is displayed;
accept a scrolling operation of the screen displayed on the display device;
determine that the screen contains a concatenated cell comprising a plurality of cells from the associated cells, wherein the concatenated cell is handled as a single cell, and wherein contents from one of the plurality of cells is displayed in the concatenated cell;
re-use display elements of cells that are excluded from a visible region by modifying attributes of the display elements of the cells that are excluded to attributes of display elements of cells that are included in the visible region;
detect display elements of cells from the concatenated cell before scrolling that are included in the visible region after the scrolling; and
reset attributes of the detected display elements to contents for displaying a part of the concatenated cell to be displayed on the screen after the scrolling.

14. The program according to claim 13, wherein the program causes the computer to:
if a number of cells included in the visible region is larger than a number of cells excluded from the visible region, generate new display elements of a number equal to a difference between the number of cells included and the number of cells excluded; and
display the cells included in the visible region on the display device using the generated new display elements.

15. The program according to claim 13, wherein the program causes the computer to:
if cells are arranged on the screen in a matrix and cells constituting at least one column are excluded from the visible region while cells constituting at least one column are newly included in the visible region as a result of another scrolling operation, re-use display elements of the cells constituting the at least one column that is excluded from the visible region by modifying attributes of the display elements of the cells constituting the at least one column that is excluded from the visible region according to a correspondence between positions in a row direction of the cells constituting the at least one column that is included in the visible region and positions in the row direction of the cells constituting the at least one column that is excluded from the visible region.

16. The program according to claim 13, wherein the program causes the computer to:
if cells are arranged on the screen in a matrix and cells constituting at least one row are excluded from the visible region while cells constituting at least one row are newly included in the visible region as a result of a scrolling operation, re-use display elements of the cells constituting the at least one column that is excluded from the visible region by modifying attributes of the display elements of the cells constituting the at least one row that is excluded from the visible region according to the correspondence between positions in a column direction of the cells constituting the at least one row that is included in the visible region and positions in the column direction of the cells constituting the at least one row that is excluded from the visible region.

17. The program according to claim 13, wherein the program causes the computer to:

calculate a maximum value of a number of cells to be displayed at once on the screen based on a size of the screen and a size of each of the cells; and generate the display elements of the number of cells specified by the calculated maximum value.

18. The program according to claim 13, wherein the program causes the computer to:

in response to receiving the scrolling operation, if a first cell is excluded from a visible region displayed on the display device and a second cell is newly included in the visible region as a result of the scrolling operation, displaying the second cell that is included in the visible region on the display device by re-using the display element associated with the first cell for the second cell by modifying a content of an attribute of the display element that is used to display the first cell that is excluded from the visible region to a content of the attribute of the display element that is used to display the second cell that is included in the visible region, wherein the content of the attribute includes location information.

* * * * *